June 27, 1972 W. H. SQUIER 3,673,034
METHOD FOR COATING, LAMINATING, AND MOLDING
AUTOMOBILE FLOOR COVERINGS
Filed May 5, 1969 3 Sheets-Sheet 1
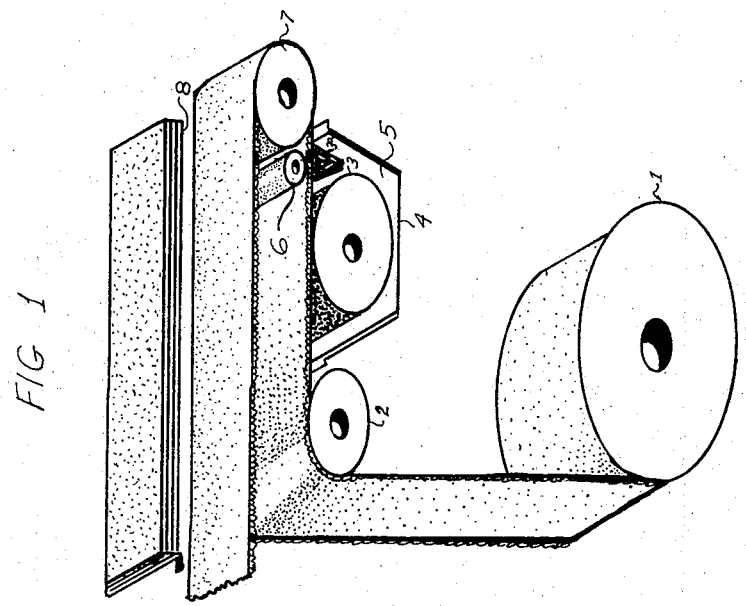
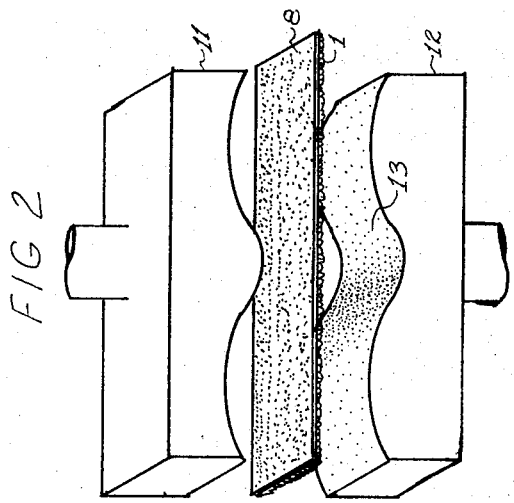
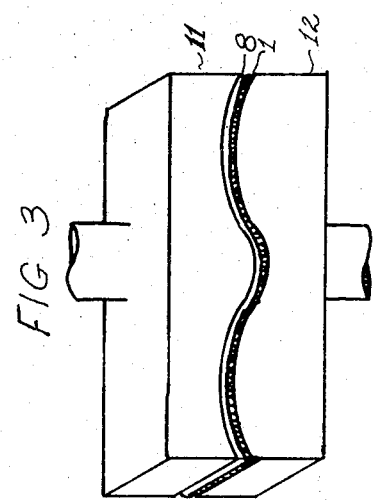
INVENTOR.
WILLIAM H. SQUIER

INVENTOR.
WILLIAM H. SQUIER

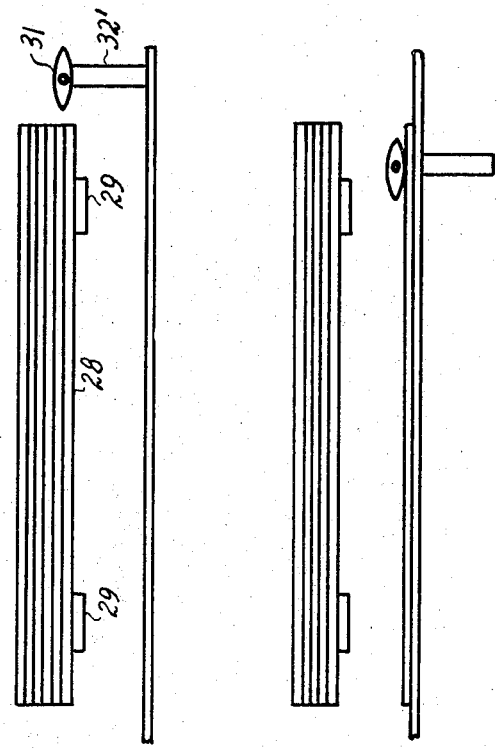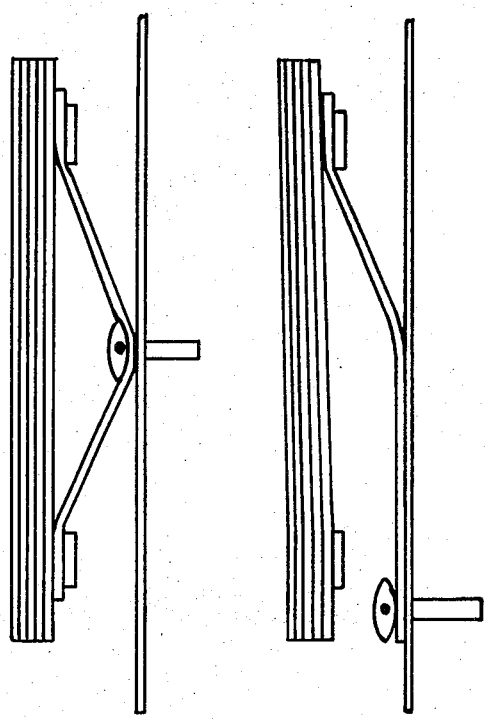

United States Patent Office 3,673,034
Patented June 27, 1972

3,673,034
METHOD FOR COATING, LAMINATING, AND MOLDING AUTOMOBILE FLOOR COVERINGS
William H. Squier, 104 Eastbourne Road,
Greenville, S.C. 29611
Filed May 5, 1969, Ser. No. 821,924
Int. Cl. B29c 3/00
U.S. Cl. 156—222                    6 Claims

ABSTRACT OF THE DISCLOSURE

A process is disclosed for the molding of automotive floor coverings. A molten thermoplastic composition is applied to the back of a length of carpet. The carpet is immediately laminated to a backing pad and the laminate is immediately formed in a mold.

---

The present invention relates to automotive molded carpets and to an improved method and apparatus for producing same. More particularly it relates to a continuous co-ordinated system comprising coating with a hot thermoplastic composition, laminating an acoustic backing pad, and forming without intermittent cooling and reheating cycles which, in combination, produces a more functional carpet, allows a greater choice of design materials, and effects inherent economies.

In the past, hot thermoplastic compositions have been employed in the manufacture of molded automobile floor coverings either to serve as a laminate and tuft lock medium on tufted carpets to jute paddings, or to serve principally as the shape retaining medium of the molded carpet in addition to the above functions. In some instances it has been necessary to employ heated presses during molding in order to obtain the desired lamination and tuft lock values. In other instances it was necessary to completely reheat the thermoplastic composition after cooling to room temperature prior to forming in cold presses in order to achieve the desired properties.

For example, the presently adopted universal method of forming automotive carpets utilizes polyethylene powder as a thermoplastic granular material deposited uniformly to the back of automotive carpeting which has been tufted into woven jute as the primary backing. The polyethylene powder is then heated to a temperature of approximately 500 degrees F., which melts the powder and allows the hot thermoplastic material to flow. The uniformity of flow is enhanced, simultaneously while the temperature is reduced by a subsequent chill roll. The carpet is then cut to predetermined lengths, and is reheated from room temperature to melting temperature of the polyethylene by ambient heat, then the rectangular carpet is manually lifted by two operators from the reheat tray and reversed (top to bottom) followed by placing over the bottom mold member to which has been previously placed a jute pad underlay for sound control effects. The top plug mold then engages the matched bottom recess mold so that the carpet backing will adhere to the jute pad, and the lamination will conform to automobile floor plan for which it is so constructed.

The primary purpose of a molded automotive carpet is to express a luxury feature, which in turn is enhanced by conforming well to the floor plan, has good functional properties, and demonstrates an erect pile appearance.

The above described commercial methods of producing automotive carpets is deficient in all these areas. For example the principal method causes a poor fit or poor conformity to the floor pan because of the properties of the shape forming medium. Low density polyethylene of about .923 density has a tendency to be rigid and fails to relax in the corner or pocket areas and wall areas varying somewhat with changes in temperature.

Another disadvantage of the usual product is the poor abrasion resistance of face yarns due in part to a failure of the high melt temperature polyethylene to flow deeply into the interstices of the woven jute, thereby failing to properly secure the fiber bundle of the face yarns resulting in loose fibers being removed during use or poor abrasion resistance.

Another disadvantage of the usual said system and similarly modified systems is a failure to produce a carpet with a good lofty pile appearance. This is due to the face yarn flattening action caused by high pressure of the cooling rolls against the carpet after sintering, and also the pressure of the carpet sliding and flattening against the mold face during forming, both of which occur just after the carpet has been subjected to ambient temperatures in excess of 500 degrees F. which, in turn, adds to the compression of carpet face yarns.

Another disadvantage of the present said system and similarly modified systems is the limitation of backing materials employed into which carpet yarns are tufted. Presently, woven jute primarily from India is used mostly. In an unstable world economy today it is becoming increasingly important to utilize synthetic woven constructions made from polyolefin, polyamide, or polyester fibers, but the use of these materials is necessarily limited by the high ambient temperature in excess of 500 degrees F. employed to melt the polyethylene. For instance, a carpet constructed with polypropylene as the primary backing which has applied to its backing polyethylene powder followed by ambient melting of the polyethylene would lose all dimensional stability due to the heat sensitivity of polypropylene yarns to high ambient temperatures. For the same reason, the highly popular polypropylene face yarns would be prohibited from carpet constructions produced by the presently described commercial process.

Another disadvantage of the present conventional system is the safety hazard to operators. Two operators manually lifting, reversing, and transporting an extremely high temperature coated fabric can produce serious burns, so that it is necessary to wear bulky asbestos gloves for protection; this makes the above manual operation even more cumbersome. Also, the closing of the press requires that both operators have their hands first removed, otherwise they may be seriously injured.

It is, therefore, an object of this invention to provide a molded automobile floor covering which overcomes the disadvantages and limitations of conventional automotive floor coverings.

Another object of this invention is to provide a method of manufacturing which is safer, more efficient, and has inherent economies, as compared with the above described automobile floor covering manufacturing methods.

For a better understanding of the invention reference will now be made to the accompanying drawings wherein:

FIG. 1 is an isometric view of the coating and lamination operations;

FIG. 2 is an isometric view of the laminated carpet and jute prior to forming in the press;

FIG. 3 is an isometric view of the laminated carpet being formed in the press;

Figure 4:
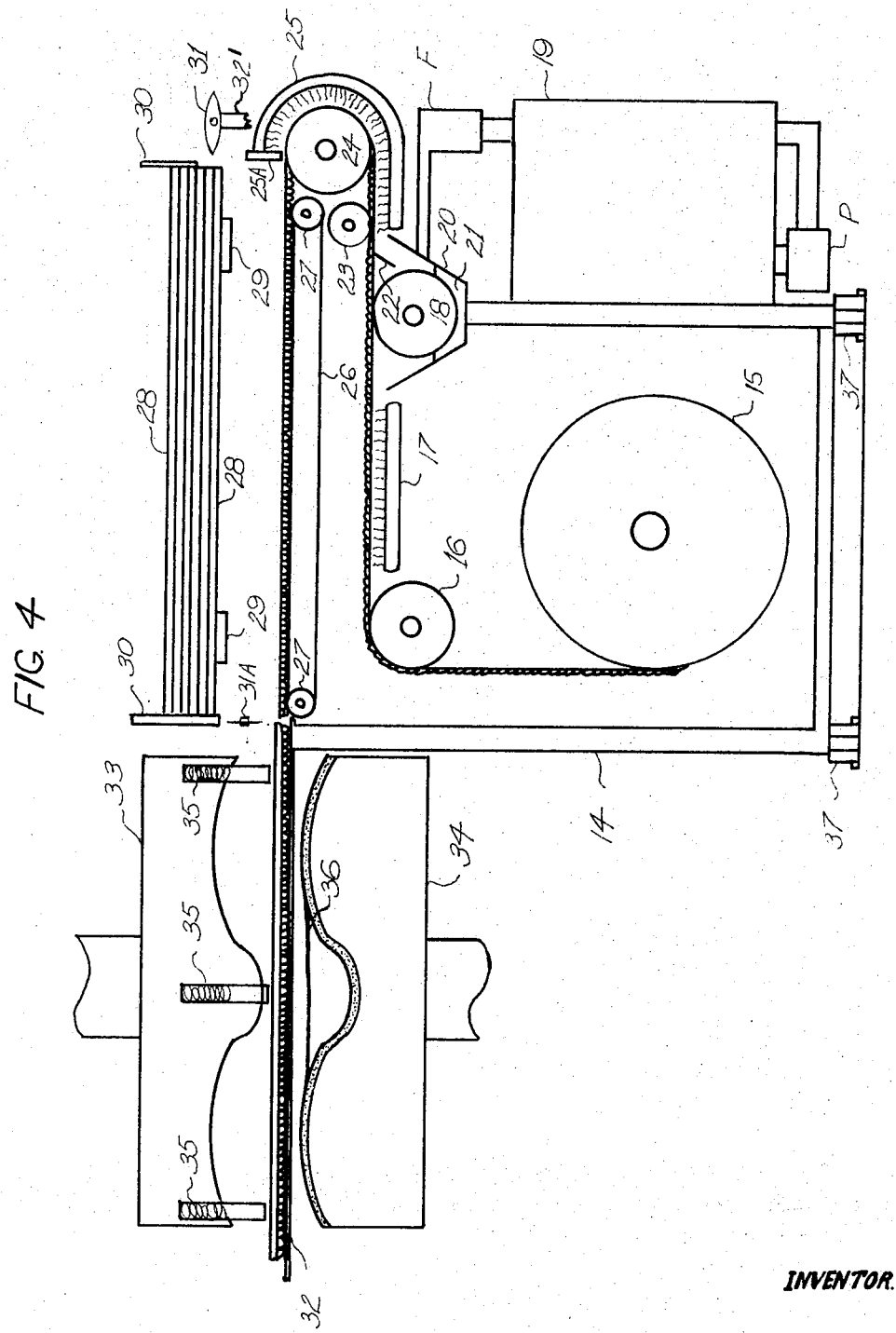
FIG. 4 is a detail side view of the preferred embodiment and corporate operations of the invention.

FIGS. 5, 6, 7, and 8 are sequential side views of the jute separation and subsequent lamination to the heated thermoplastic composition.

Referring more particularly to the drawings in FIGS. 1, 2, and 3 for a pictorial disclosure of the sequence of major operations only a tufted carpet 1 is unwound over a second driven guide roll 2 then over the surface of a driven heated coating roll 3 which is partially immersed in a melted thermoplastic composition 5 both of which are contained in an insulated reservoir 4. The thermoplastic coating weight is then controlled by passing over an angular doctor bar 3a lightly pressured by a top idler roll 6 over a driven guide roll 7 into an upright position of the thermoplastic composition coating so that the pre-cut jute pad 8 is laminated then transmitted to the press members 11 and 12 and formed with a flexible extensible resilient blanket (not shown) extending between the carpet face 1 and the face of the bottom mold 12 at position 13.

In accordance with the invention in detail, carpet yarns are previously tufted into a woven jute backing fabric which is then coated with a melted thermoplastic composition as the principal shape retaining medium which, in addition, is also designed to meet all other functional requirements of a molded automobile floor covering. While a tufted carpet with a woven jute backing is the preferred embodiment, a woven or even non-woven carpet could be employed along with synthetic backing fabrics for tufted fabrics composed of woven polyolefin, polyester or polyamid fibers without departing from the scope of the invention. FIG. 4 pictures a full sized roll of said tufted carpet 15 which is unrolled by means of a motor drive synchronized with connecting chains to rolls 16, 18, and 24, which combination, in turn, is synchronized in speed with the surface speed of the conveyor belt 26 around driven rolls 27 at a speed of about 12 feet per minute.

In some instances such as with woven jute backings of tufted carpets it is preferable to preheat the back of the uncoated carpet in order to improve the adhesion of the thermoplastic composition and to aid in preventing loss of heat prior to lamination and forming. The amount and type of heat employed can vary and in some instanses, such as with polypropylene backing fabrics, little or no preheat is called for; however, with normal woven jute backings, a Calrod unit 17 or radiant type heater raising the surface temperature of the fabric to about 290 degrees F. is preferred.

The composition of thermoplastic materials incorporated in the coating could include low molecular weight polyethylene resins, ethylene-vinyl acetate copolymer resins, along with hydrocarbon resins, waxes, fillers, or other components in proper proportion to effect the total end-use performance requirements of a molded automobile floor covering. It has been stated that the principal requirement of the thermoplastic composition is shape retention of the carpet, but other important functional properties include tuft lock, adhesion to jute, good abrasion resistance, tensile strength and low temperature flexibility.

There are many thermoplastic materials that could be incorporated in combination, but preferably the materials should remain in a coating range of about 270 degrees F. to 350 degrees F. for conventional jute backings and preferably in a range of about 290 degrees F. to 320 degrees F. Thermoplastic woven backings such as polypropylene are coated generally in a range of 260 degrees F. to 320 degrees F. and preferably in a range of about 270 degrees F. to 290 degrees F. Examples of some formulations found to be effective were:

Example #1:
  50 parts Epolene C-10
  35 parts Tenite 811
  15 parts Neville LX-1000

Example #2:
  70 parts Tenite 812
  30 parts Staybelite

The thermoplastic composition is transferred from an insulated hot oil heated supply source 19 through pump P then through filter F to the coating reservoir 20 and applied by means of the partially immersed heated roll 18 turning clockwise at the stated surface speed thereby depositing an excess of thermoplastic composition onto the back of the carpet, the excess of which is removed by the angular doctor bar 22 adjusted to regulate the required weight varying between 8 and 16 ounces per square yard, and normally about 10 to 12 ounces per square yard.

The pressure of the angular doctor bar 22 against the carpet backing and the contact of the heated immersion roll against the same is controlled by the light pressure of the idler roll 23 against the face of the carpet. This idler roll is released from against the face of the carpet thus releasing the back of the carpet from the heated immersion roll 18 and doctor bar 22 at the time of cycling when the entire coating laminating assembly moves to the next adjacent molding position as will be described in detail later. The carpet then progresses forward around guide roll 24 and onto conveyor belt 26 to a position just below the supported jute pad 28.

While the above described thermoplastic coating technique is the preferred embodiment it is possible to vary the technique somewhat at this point without departing from the scope of the invention. For example, an extruder or curtain type coater of thermoplastic composition could be employed in a straight line assembly just prior to the lamination which would be considered within the spirit and scope of the invention.

Lamination of the jute pad 28 to the thermoplastic composition now on the back of the carpet and positioned just below the jute on the conveyor belt 26 is as follows: Refer to FIGS. 5, 6, 7, and 8 wherein the separation of the lowest positioned jute pad 28 supported by the two supports 29 is first removed from the supports and laminated to the carpet by means of a doubleheaded spear shaped horizontal guide 31, attached to a vertical support 32, the guide of which is equal in length to the width of the jute pad 28 which moves horizontally from right to left stopping at the center between the first and second lowest jute pads. The jute pad supports 29 are suspended vertically upwards on the left side of the assembly (not shown) while the vertical guide support 32 is attached to the guide 31 on the right side of the assembly facing the starting position of the guide 31. From the center position the guide moves vertically downward FIG. 6 then to the far left FIG. 7 then to the far right FIG. 8 and finally into the original starting position FIG. 5. It is apparent from this description that this technique and apparatus serves a dual function of removing one layer of jute from the other layers while they remain suspended and at the same time effectively deposits and laminates, with pressure, the jute to the back of the carpet which has been previously treated with a hot thermoplastic composition.

Immediately after lamination, the laminate is then transported by the conveyor belt 26 onto a smooth surface support tray 32 which has been Teflon coated to reduce friction. The tray 32 is approximately 2 inches less in width than the carpet and is positioned between the open molds 33 and 34. At this particular point a knife 31A cuts the laminate from the carpet and simultaneously engages a solenoid which releases the three spring clamps 35 attached to the outer edge of the upper mold 33 thereby anchoring the carpet edge to the extensible blanket 36 which in turn is pressed in part against the bottom mold 34. The extensible, resilient, blanket acts as a carpet face shield thus protecting it during forming. A heavy coating of release agent may be placed between the bottom mold 34 and the blanket 36 thus allowing maximum slippage without the release agent discoloring the face yarns. Preferably the extensible, resilient blanket is made from foam rubber with a thick, tough skin on the bottom side next to the bottom mold 34 and a softer more resilient surface on the side next to the carpet face. Since the carpet laminate rests face down on the extensible blanket the conforming action of the top mold 33 engaging the laminate into the bottom mold 34 causes the slippage of the blanket against the face of mold 34 and at the top mold 33 against the jute backing thus protecting the face yarns from extreme abrasion and pile crushing. The extensibility of the blanket allows the laminate resting thereon to conform to the mold without face abrasion, and the resiliency of the extensible blanket prevents hard crushing of the pile during final mold closure.

At the same time that the spring clamps are released the entire coating/laminating assembly moves by air pressure piston rods (not shown) attached to frame 14 on wheels 37 to the next adjacent molding position.

Also included in the above described simultaneous operations while moving the assembly, is the elimination of preheat at position 17, release of roll 23 thus disengaging carpet from heated roll 18 and doctor bar 22, and maintaining low uniform heat on Calrod radiant heater 25 the latter of which is to maintain the temperature on and the top of roll 24. At the end of the Calrod unit 25 the coated carpet in the area between the doctor bar 22 is an insulated (for cooling) zone 25A which will permit about one to two inches of cooled thermoplastic laminate in the center area of cutting with 31A thus permitting easy cutting in this narrow cooled band and a uniformly heated coating across the entire carpet length at the next cycle.

It is possible with open molds to move the entire coating/laminating assembly between matching molds arranged in a circle, or in other variously spaced positions without departing from the scope of this invention, however the preferred embodiment is to cycle alternately between two forming positions, the first having the top mold clamps on the left side and second having the top mold clamps on the right side both facing the front of the edge guide 31.

The above described process by virtue of the choice of a blend of lower temperature coating materials in combination and sequence with the above described operations produces a carpet which conforms better to the floor pan and exhibits better abrasion resistance than conventional carpets. Also the pile appearance is lofty by less manufacturing abuse due to an absence of roll and mold crushing of the pile by eliminating the roll crushing altogether and discovering the extensible, resilient blanket effect during molding.

In addition to the above advantages my process unlike the others is not limited in the type of face or backing yarns available for construction. Also my system is safe in that it is continuous with no operators required for manually transporting or molding hot carpet.

The inherent economies of this new process are realized by less time, less labor, less floor space, and less expenditure of capital investment.

Having thus described the invention in detail above for purposes of illustration only, which is not intended to be limited by this description or otherwise except as follows, I claim:

1. A process for producing a molded automobile floor covering carpet wherein a tufted carpet is laminated to a backing layer by means of a molten thermoplastic composition and formed into the shape of an automobile floor covering with the thermoplastic composition remaining in a molten state from the time of application to the forming operation, comprising the steps of:
   (a) applying a uniform layer of molten thermoplastic composition to the back of a length of tufted carpet;
   (b) immediately bringing a backing pad into contact with said molten thermoplastic composition on said carpet back to produce a laminate;
   (c) immediately positioning said laminate in unheated matched molds while said thermoplastic composition is still in a molten state; and
   (d) applying pressure in said mold to form said laminate to shape.

2. A process for producing a molded carpet as defined in claim 1 wherein said process is continuous.

3. A process for producing a molded carpet as defined in claim 1 wherein the carpet is preheated prior to receiving said molten themoplastic composition.

4. A process for producing a molded carpet as defined in claim 1 wherein a resilient blanket is placed in the mold to be in contact with the face of said carpet during the forming thereof.

5. A process for producing a molded carpet as defined in claim 1 wherein said laminate is secured around the periphery thereof by said mold prior to forming.

6. A process for producing a molded carpet as defined in claim 1 wherein said laminate is cut to a predetermined length prior to being placed in said mold.

References Cited

UNITED STATES PATENTS

| | | | |
|---|---|---|---|
| 2,586,275 | 2/1952 | Toulmin, Jr. | 156—78 X |
| 1,867,224 | 6/1932 | Lange | 156—222 X |
| 2,482,981 | 10/1949 | Kamrass | 156—224 X |
| 2,631,955 | 3/1953 | Muskat | 156—323 X |
| 3,175,936 | 3/1965 | Squier et al. | 156—245 X |
| 3,388,018 | 6/1968 | Squier et al. | 156—242 |

BENJAMIN A. BORCHELT, Primary Examiner

G. E. MONTONE, Assistant Examiner

U.S. Cl. X.R.

156—72, 224, 242, 245